United States Patent
Shiota et al.

(10) Patent No.: US 6,954,349 B2
(45) Date of Patent: Oct. 11, 2005

(54) METALLIZED FILM CAPACITOR

(75) Inventors: Kohei Shiota, Hyogo (JP); Toshihiro Sasaki, Toyama (JP); Shigeo Okabe, Toyama (JP); Hiroki Takeoka, Osaka (JP); Toshiyuki Nishimori, Toyama (JP); Toshiharu Saito, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 23 days.

(21) Appl. No.: 10/479,957

(22) PCT Filed: Jun. 6, 2002

(86) PCT No.: PCT/JP02/05592

§ 371 (c)(1),
(2), (4) Date: Jun. 3, 2004

(87) PCT Pub. No.: WO02/101770

PCT Pub. Date: Dec. 19, 2002

(65) Prior Publication Data

US 2004/0232465 A1 Nov. 25, 2004

(30) Foreign Application Priority Data

Jun. 8, 2001 (JP) .......................... 2001-173663
Jun. 8, 2001 (JP) .......................... 2001-173677
Sep. 4, 2001 (JP) .......................... 2001-267270

(51) Int. Cl.[7] ............................................ H01G 4/005
(52) U.S. Cl. ................. 361/303; 361/302; 361/305; 361/311; 361/301.5; 361/314
(58) Field of Search ................. 361/302, 303, 361/305, 301.5, 304, 309, 311, 313, 314, 315, 323, 273

(56) References Cited

U.S. PATENT DOCUMENTS

| 3,714,528 A | * | 1/1973 | Vail .......................... 361/303 |
| 3,895,129 A | | 7/1975 | Craig et al. |
| 5,610,796 A | * | 3/1997 | Lavene ..................... 361/303 |
| 5,724,222 A | * | 3/1998 | Hirano et al. ............. 361/311 |

FOREIGN PATENT DOCUMENTS

| JP | 50-18962 | 2/1975 |
| JP | 59-40519 | 3/1984 |
| JP | 2-285618 | 11/1990 |
| JP | 3-109326 | 11/1991 |
| JP | 7-24251 | 3/1995 |
| JP | 11-260662 | 9/1999 |

* cited by examiner

*Primary Examiner*—Dean A. Heichard
*Assistant Examiner*—Nguyen T. Ha
(74) *Attorney, Agent, or Firm*—Wenderoth, Lind & Ponack, L.L.P.

(57) ABSTRACT

A metallized film capacitor is made by winding or laminating a both-side metallized polypropylene (PP) film and a non-metallized PP film. Limiting the heat shrinkage factor and the thickness of the PP films, the position of deposited electrodes, and the rate of the peeled area of the deposited electrodes to a certain range provides a metallized film capacitor having improved dieletric strength, tan δ, and charge-discharge characteristics.

20 Claims, 6 Drawing Sheets

METALLIZED FILM CAPACITOR

TECHNICAL FIELD

The present invention relates to a capacitor for use in electrical apparatus, electronic equipment, industrial equipment, and the like. It more particularly relates to a metallized film capacitor using a both-side metallized polypropylene film.

BACKGROUND ART

Conventionally, a capacitor made of a plastic film having a metal deposited thereon (hereinafter referred to as a "metallized film capacitor") has widely been used. Such films include a polypropylene film, polyethylene terephthalate film, polyphenylene terephthalate film, and polyethylene naphthalate film. Particularly, a metallized film capacitor using a polypropylene (PP) film finds a wide range of applications, from small electronic components represented by portable devices to large-scale industrial use, e.g. drive motor control of a train and high-voltage power capacitor. This is because the metallized film capacitor using a PP film has excellent electrical characteristics, e.g. a small dielectric loss, high withstand voltage, and little fluctuation of the dielectric constant caused by changes in temperature and frequency. Additionally, the metallized film capacitor using a PP film is relatively inexpensive.

Figure 4:
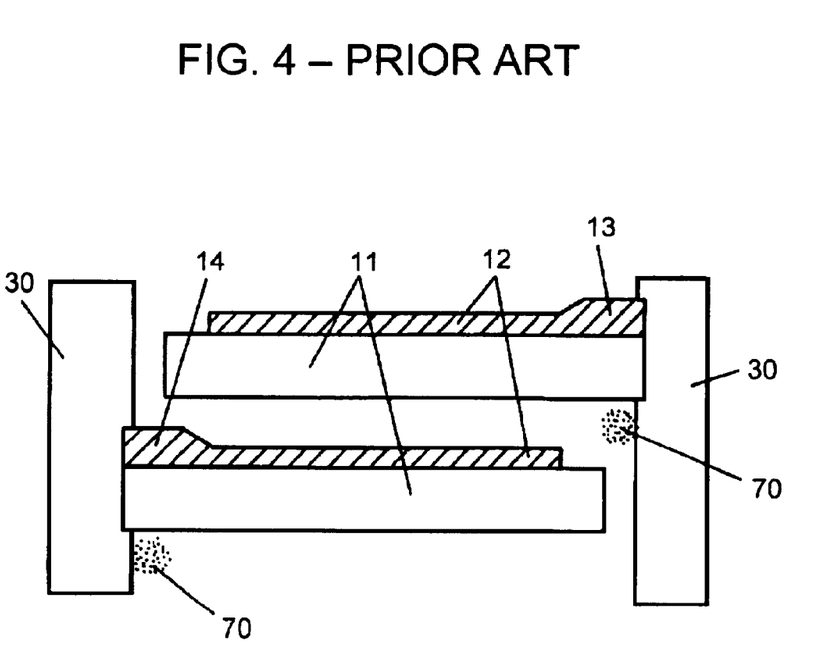
FIG. 4 is a schematic section of a conventional art, illustrating how films thereof are opposed to each other.

FIG. 4 is a sectional view of a conventional metallized film capacitor using a PP film. The capacitor comprises two sheets of PP film 11 and metal-sprayed portions 30. Each of the two sheets of PP film 11 has metal 12 deposited on one side thereof, and are overlaid and wound or laminated. Metal-sprayed portions 30 are formed by spraying metal from both edge faces of the capacitor.

Widely employed structure of deposited metal 12 is a heavy edge structure shown in FIG. 4. Deposited metal 12 in a capacity-forming electrodes portion is thinner to improve self-healing capability and the metal contact portions with sprayed metal 13 and 14 in contact with metal-sprayed portions 30 are thicker to enhance the contact strength with respect to metal-sprayed portions 30. The self-healing capability enables restoring of the capability of the capacitor when local dielectric breakdown has occurred in a portion of a film. Evaporation and scatter of the deposited metal around of the portion interrupts the current. Commonly used as deposited metal 12 is aluminum, zinc, or mixtures thereof. When aluminum is used, its bonding strength wih respect to metal-sprayed portions 30 is weak. Additionally, when alternating voltage is applied to the capacitor for an extended period of time, deterioration of aluminum caused by oxidation thereof decreases the capacity. Because of these problems, in recent years, deposited metal essentially consisting of zinc is used in many cases. Deposited metal made of mixtures of zinc and aluminum is also used to improve humidity resistance of zinc.

In a structure shown in FIG. 4 (hereinafter referred to as a "one-side metallized film capacitor"), two sheets of PP film each having deposited metal on one side thereof are used. Thus, each sheet requires a vacuum deposition step and this necessitates a large number of man-hours. If metal can be deposited onto both sides of a PP film (hereinafter referred to as a "both-side metallized PP film") by one vacuum deposition step and the film can be placed on a non-metalized polypropylene film having no deposited layer (hereinafter referred to as a "non-metallized PP film"), the vacuum deposition step can be saved to one half.

However, a conventional both-side metallized film capacitor has the following problems. Thus, its performance is inferior to that of a one-side metallized film capacitor.

First problem: when the conventional both-side metallized film capacitor is charged at low temperature or room temperature for an extended period of time, partial discharge occurs in an air gap between the films and deterioration develops. For a one-side metallized film capacitor, voltage is applied to each of the films via one layer of air gap. In contrast, for the both-side metallized film capacitor, the both-side metallized PP film has no air gap; however, the non-metallized PP film has air gaps on both sides. Thus, deterioration caused by partial discharge develops on both sides of the non-metallize PP film. Therefore, the deterioration develops at low temperature or room temperature at which partial discharge is prone to occur.

Second problem: the conventional both-side metallized film capacitor has weak contact with metal-sprayed portions. In general, for metallized film capacitors, heat aging is performed to complete the beat shrinkage of the film after metal-sprayed portions are formed at both edge faces of the capacitor element. This heat aging process is performed at high temperature to alleviate the residual stress and strain produced when the film is drawn lengthwise and widthwise in a two-way drawing step and to stabilize the dimension of the film by heat shrinkage.

When the film is shrunken widthwise in the heat aging process, stress occurs between metal-sprayed portion 30 and contact portion of deposited electrode 13. However, for the one-side metallized film capacitor of FIG. 4, each of the films is in contact with the metal-sprayed portion only at one edge and thus the stress is extremely small. In contrast, for the both-side metallized film capacitor, the both-side metallized film is in contact with the metal-sprayed portions at both edges. Thus, large stress occurs at both edges and the contact portions are prone to deteriorate. Especially, heat shrinkage of polypropylene (PP) film is larger than that of a polyethylene terephthalate film, polyphenylene terephthalate film, and polyethylene naphthalate film. Thus, a PP film is prone to cause contact failure in metal-sprayed portions.

Third problem: in the case of a capacitor element impregnated or filled with insulating oil 70, the insulating oil permeating into a both-side metallized film swells the film. Thus cracking or peeling of the deposited metal occurs and the resistance of the deposited layer increases. Especially, a PP film has an adhesive strength with respect to the deposited layer smaller than that of other films and insulating oil is more permeable into PP films. Therefore, increase in the resistance of the deposited layer deteriorates tan δ and deterioration of the deposited layers in the vicinity of metal-sprayed portions deteriorates contact.

Fourth problem: the conventional both-side metallized film capacitor is prone to cause insulation breakdown when over voltage is applied thereto. In order to improve adhesion of a PP film to a deposited layer, it is common that wettability of the surface of the PP film is improved by corona treatment in production of the PP film. In general, in the corona treatment, a drawn film runs in corona discharge generated at high voltages ranging from several thousands to several dozens of thousands of volts so that the surface of the film is activated. However, a PP film having a small thickness of approx. several micrometers for use in a capacitor is damaged by the corona treatment and thus dielectric strength thereof decreases. The PP film for use in a capacitor has a large number of projections and depressions. When both sides of such a film are metallized, the thickness distribution of the film has direct influence on the dielectric strength of the capacitor. Therefore, because a portion of the film having depressions on both sides is thin, the dielectric strength of the capacitor decreases. On the other hand, for a one-side metallized film capacitor, even if the film has depressions, always existing air gaps alleviate the voltage applied to the films. For this reason, the dielectric strength of the one-side metallized film capacitor is higher than that of the both-side metallized film capacitor.

Fifth problem: in production of a both-side metallized film, the deposited layers are peeled by blocking. After deposited layers are formed on both sides of the film in the vacuum deposition step, the both-side metallized film is wound once in a vacuum evaporator. At this time, the deposited layers on both sides are in contact with each other. A PP film has low adhesive strength with respect to a deposited metal. Additionally, the roll formed after vacuum deposition is tightly contracted (i.e. the stress accumulating inside of the roll of the both-side metallized PP film is large). Thus, deposited metal layers on both sides adhere to and peel from each other. This phenomenon is called blocking. It is known that the blocking is remarkable with a deposited metal of zinc.

To address this problem, trials of decreasing blocking when zinc is deposited on both sides of a PP film have conventionally been made. For example, U.S. Pat. No. 3,895,129 discloses a method of depositing zinc on both sides of a PP film. In this invention, after the deposited surface on one side is air-sprayed to oxidize the deposited metal surface, the film is wound into a product roll. The Japanese Patent Examined Publication No. H07-24251 discloses a both-side metallized polyolefin film capacitor having a both-side metallized polyolefin film and a film for combination. For the both-side metallized polyolefin film, zinc is deposited on both sides of a polyolefin film that contains oxidation inhibitor having a melting point of at least 156° C. and an aluminum layer is formed on the deposited metal.

However, even in the case using the method disclosed in U.S. Pat. No. 3,895,129, blocking is not completely eliminated. It is known that observations with an optical microscope and the like show the existence of a small peeled area of the deposited layer in some cases.

In other words, because blocking is caused by the contraction of a roll of both-side metallized PP film as described above, the deposited layer may peel in the inner circumference of the roll where the stress caused by the contraction accumulates even when no blocking is seen in the outer circumference of the roll. Especially increasing the tension on the PP film at vacuum deposition increases the contraction. Thus, blocking in the inner circumference is prone to increase.

Further, because blocking is a phenomenon in which deposited layers adhere to and peel from each other during unwinding, it is known that the adhesion of the deposited layers develops and the peeled area increases when the film is kept for an extended period of time in the state of the roll.

When a capacitor is produced using a both-side metallized PP film in which blocking occurs, peeling of the deposited electrodes not only decreases the effective area but also affects the electrical characteristics as a capacitor in some cases. Especially in the heavy edge structure having thicker electrodes in the metal contact portions with sprayed metal, the deposited electrodes in the capacity-forming electrodes portion are thin. For this reason, even when a small area of the electrodes peels, the resistance of the deposited electrodes significantly increases and the capability of the electrodes is lost. Therefore, tan δ (dielectric loss) increases and the characteristics inherent to a metallized PP capacitor, i.e. a small loss, cannot be obtained.

Further, when zinc is deposited on both sides of a PP film and an aluminum layer is formed on the deposited metal as described in the Japanese Patent Unexamined Publication No. H07-24251, zinc-deposited layers are not in contact with each other and thus blocking is prevented. However, because the aluminum layer extends to cover the electrode leads, the feature of zinc vacuum deposition, i.e. excellent contact with the metal-sprayed portions, is affected.

DISCLOSURE OF THE INVENTION

To address these problems, a metallized film capacitor of the present invention uses a non-metallized polypropylene (PP) film having a lengthwise heat shrinkage factor at 120° C. of at least 4%.

As another means of addressing these problems, in the metallized film capacitor of the present invention, a both-side metallized film having a deposited metal formed on both sides of a first polypropylene (PP) film and a second PP film are wound or laminated so as to be opposed to each other. The first PP film has a widthwise heat shrinkage factor at 120° C. of at most 1.0%.

DETAILED DESCRIPTION OF PREFERRED EMBODIMENTS

The present invention is specifically described with reference to the accompanying drawings.

Figure 1:
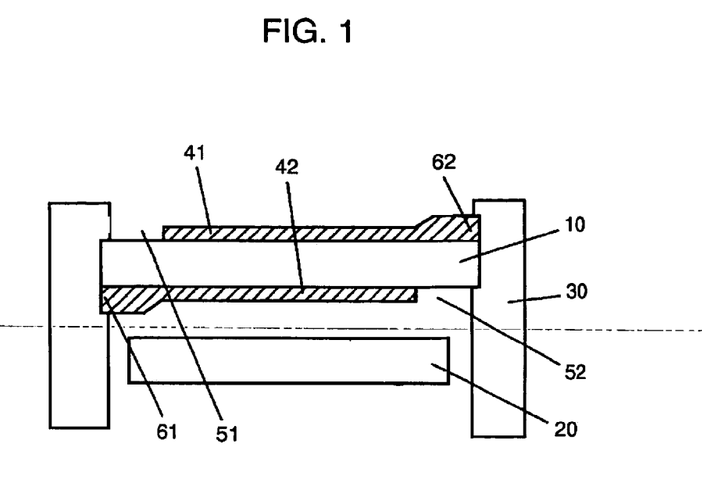
FIG. 1 is a schematic section of an exemplary embodiment of the present invention, illustrating how films thereof are opposed to each other.

As shown in FIG. 1, a metallized film capacitor of the present invention includes first polypropylene (PP) film 10, second PP film 20, metal-sprayed portions 30, deposited electrodes 41 and 42, insulating margins 51 and 52, and metal contact portions with sprayed metal 61 and 62.

In the metallized film capacitor of the present invention, second PP film 20 shown in FIG. 1 has a lengthwise heat shrinkage factor at 120° C. of at least 4%. Thus, the lengthwise shrinkage of the second PP film, i.e. a combination film, is sufficiently large in a heat aging step after metal-sprayed portions 30 are provided. This can decrease air gaps existing on both sides of second PP film 20 and damage thereto caused by corona discharge at low temperature. As a result, deterioration of the capacitor when it is charged at low temperature or room temperature for an extended period of time can be prevented.

As shown in FIG. 1, the metallized film capacitor of the present invention has deposited electrodes 41 and 42 on both sides of first PP film 10. First PP film 10 has a widthwise heat shrinkage factor at 120° C. of at most 1.0%. This can reduce the widthwise stress on the both-side metallized film in the heat aging step after metal-sprayed portions 30 are provided. As a result, occurrence of contact failure between the deposited electrodes and metal-sprayed portions 30 can be inhibited.

Further, in the metallized film capacitor of the present invention, first PP film 10 is thicker than second PP film 20. This structure can prevent a decrease in the withstand voltage of the capacitor caused by projections and depressions on the both-side metallized film even when a film thinner than conventional one is used. Additionally, it is preferable that maximum surface roughness Rmax of first PP film 10 and second PP film 20 ranges from 1 to 2 μm and average surface roughness Ra is at least 0.1 μm (Rmax and Ra being measured according to JISB0601). It is also preferable that first PP film 10 is 0.5 to 2 μm thicker than second PP film 20.

In the metallized film capacitor of the present invention, the rate of the peeled area of the deposited layer in the capacity-forming electrodes portion is up to 4%, on each side of both-side metallized PP film 10. This can realize an excellent metallized film capacitor free from deterioration of tan δ or thermal runaway caused by blocking, which is one of the problems. The methods of reducing the rate of the peeled area of the deposited layer in the capacity-forming electrodes portion to 4% or smaller include spraying oxygen onto the deposited layer. However, this embodiment is not limited to this method and any other method can be used for this purpose.

In the metallized film capacitor of the present invention, the membrane resistance of the capacity-forming electrodes portion (deposited electrodes 41 and 42) is higher than that of the electrode lead (metal contact portions 30 with sprayed metal 61 and 62) on each of deposited electrodes 41 and 42 of both-side metallized film 10. This can provide excellent contact of metal-sprayed portions 30 with the deposited electrodes.

In the metallized film capacitor of the present invention, each of deposited electrodes 41 and 42 contains one of copper, silver, and aluminum as a seed metal thereof, and zinc is deposited on the seed metal. This structure can realize a preferable metallized film capacitor free from decrease in capacity even in application of alternating voltage for an extended period of time.

In the metallized film capacitor of the present invention, each of deposited electrodes 41 and 42 has aluminum as a lower layer and zinc as an upper layer. This structure can realize a metallized film capacitor having excellent humidity resistance.

With reference to FIG. 1, in each of deposited electrodes 41 and 42, the capacity-forming electrodes portion is thinner than the electrode lead, and the rate of the peeled area of the deposited metal is up to 4%. This structure can reduce the vacuum deposition step to only one time and realize a metallized film capacitor providing a small loss and excellent contact of metal-sprayed portions 30.

Next, another embodiment of the present invention is described with reference to FIG. 2.

Figure 2:
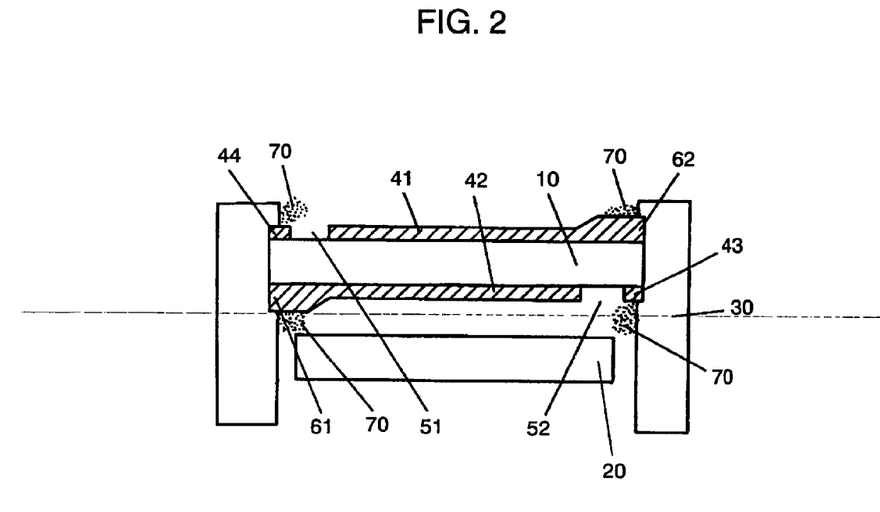
FIG. 2 is a schematic section of another exemplary embodiment of the present invention, illustrating how films thereof are opposed to each other.

The metallized film capacitor shown in FIG. 2 includes first polypropylene (PP) film 10, second PP film 20, metal-sprayed portions 30, deposited electrodes 41, 42, 43, and 44, insulating margins 51 and 52, and metal contact portions with sprayed metal 61 and 62.

In the metallized film capacitor of the present invention, deposited electrodes 41 and 42 are formed on PP film 10, and deposited electrode 43 is formed at one edge of first PP film 10 where insulating margin 52 is formed on deposited electrode 42. Because of this structure, metal-sprayed portions 30 connect to deposited metal 41 and 43 at one edge and to deposited metal 42 and 44 at the other edge. In other words, mechanical connection is provided on both sides of the film. This structure increases the mechanical strength of metal-sprayed portions 30 and can maintain stable contact of the metal-sprayed portions even in heat cycles, e.g. heat generation in operation and cooling at rest, during use of the capacitor.

In the case of a capacitor impregnated or filled with insulating oil 70 in the entire part thereof, the deposited metal is effective in inhibiting entry of insulating oil 70 into first PP film 10 in the vicinity of metal-sprayed portions 30. This can prevent deterioration of tan δ and contact in use of insulating oil, which is one of the problems.

Further, still another exemplary embodiment of the present invention is described with reference to FIG. 3.

Figure 3:
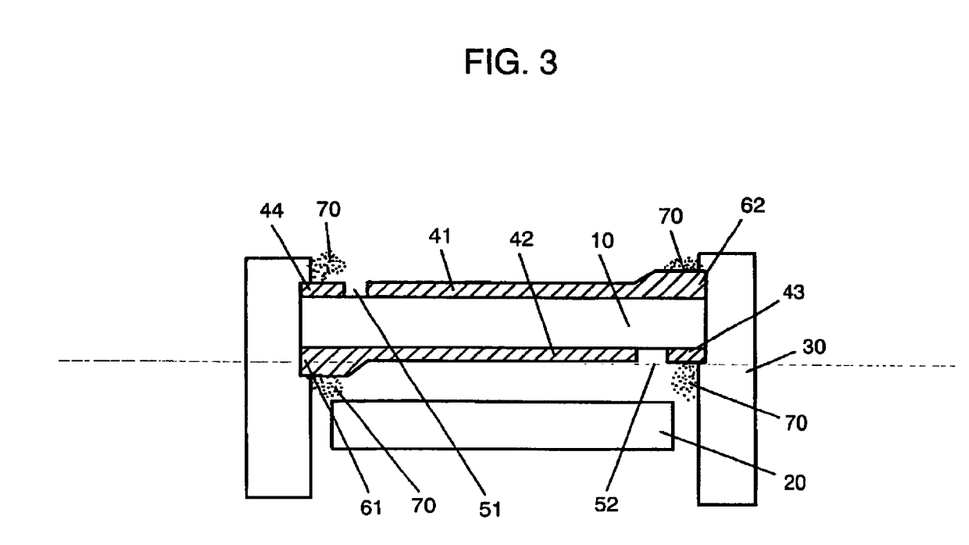
FIG. 3 is a schematic section of still another exemplary embodiment of the present invention, illustrating how films thereof are opposed to each other.

FIG. 3 shows that a metallized film capacitor includes first polypropylene (PP) film 10, second PP film 20, metal-sprayed portions 30, deposited electrodes 41, 42, 43, and 44, insulating margins 51 and 52, and metal contact portions with sprayed metal 61 and 62. In the metallized film capacitor of the third exemplary embodiment, second PP film 20 is disposed in contact with deposited electrode 43 at the edge on the side of insulating margin 52. This arrangement prevents direct contact of PP film 10, i.e. the base of the both-side metallized film, with insulating oil 70. Thus, preventing entry of the insulating oil is more effective.

In FIG. 3, a gap is shown between second PP film 20 and deposited electrode 43 at the edge on the side of insulating margin 52 for a better understanding. However, in fact, second PP film 20 is in intimate contact with deposited electrode 43 and the entire surface of insulating margin 52 and a part of deposited electrode 43 are covered with PP film 20.

For the metallized film capacitor of the present invention, with reference to FIG. 3, one side of second PP film 20 is not subjected to corona treatment and the other side is subjected to corona treatment. This can prevent damage to second PP film 20 caused by corona treatment and decrease in dielectric strength while excellent adherence between the second PP film and the deposited layers is maintained.

First Exemplary Embodiment

Examples and conventional examples are produced for each of these exemplary embodiments and the experimental results thereof are detailed hereinafter.

In Example 1, after aluminum is formed, as a seed metal, on both sides of first polypropylene (PP) film 10 having a thickness of 6 μm and a widthwise heat shrinkage factor at 120° C. of at most 1.0%, deposited layers are formed so that a high resistance portion corresponding to the capacity-forming electrodes portion has a resistance of 15±3Ω/□ and metal contact portions with sprayed metal 61 and 62 have a resistance of 5±2Ω/□. Insulating margins 51 and 52 are 1.5 mm wide. Deposited electrodes 43 and 44 are provided at the edges on the side of the insulating margins. The first film is 81 mm wide. Used as second PP film 20 is a PP film having the same thickness of 6 μm and a lengthwise heat shrinkage factor at 120° C. of at least 4% and subjected to no corona treatment. The second film is 79 mm wide. The both-side metallized film and the non-metallized film, i.e. second PP film 20, prepared in this manner are wound so that the second film 20 is placed in the center of the both-side metallized film 10. This makes the amount of displacement between both edges of first PP film 10 and both edges of second PP film 20 (hereinafter referred to as "displacement") 1 mm at each edge face. Insulating margins 51 and 52 are covered with PP film 20. After winding, Zn is sprayed onto both edge faces.

Example 2 is produced by using a PP film having a widthwise heat shrinkage factor at 120° C. of 1.5%, as a first PP film. The other structure is the same as that of Example 1.

Example 3 is produced by using a PP film having a lengthwise heat shrinkage factor at 120° C. of 3%, as second PP film 20. The other structure is the same as that of Example 1.

In Example 4-1, deposited electrodes 43 and 44 are not provided at the edges on the side of insulating margins on both sides of a first PP film, and insulating margins 51 and 52 are 3.0 mm wide. A second PP film is 77 mm wide and placed in the center of the first PP film. The other structure is the same as that of Example 1. This arrangement provides a displacement of 2 mm at each edge face. Covered with second PP film 20 is only a part of each of insulating margins 51 and 52.

In Example 4-2, deposited electrode 43 at the edge on the side of an insulating margin is provided only on one side of first PP film 10 and the opposite side of the PP film does not have a deposited electrode at the edge. The other structure is the same as that of Example 4-1.

In Example 5-1, second PP film 20 is 77 mm wide and placed in the center of a both-side metallized film and wound together. The other structure is the same as that of Example 1. Thus, the displacement is 2 mm and only a part of each of insulating margins 51 and 52 is covered with second PP film 20.

In Example 5-2, second PP film 20 is 78 mm wide and placed in a position 1 mm displaced from the center of a both-side metallized film and wound together. The other structure is the same as that of Example 1. In this case, the displacement is 2 mm at one edge and 1 mm at the other edge. Thus, one insulating margin is completely covered with the second PP film; however, only a part of the other insulating margin is covered with the film.

In Example 6-1, both sides of second PP film 20 are subjected to corona treatment. The other structure is the same as that of Example 1.

In Example 6-2, only one side of second PP film 20 is subjected to corona treatment. The other structure is the same as that of Example 1.

For Conventional Example 1, a conventional one-side metallized capacitor is produced. After aluminum is formed, as a seed metal, on one side of 6-μm-thick PP film 11 subjected to corona treatment on one side, a deposited layer is formed so that a high resistance portion has a resistance of 15±3Ω/□ and metal contact portions with sprayed metal have a resistance of 5±2Ω/□. Insulating margins are 3 mm wide and the film is 80 mm wide. After the one-side metallized films prepared in this manner are wound together so that the two films are displaced by 1 mm, Zn is sprayed onto both edge faces. The other structure is the same as that of Example 1.

All of these examples and conventional examples are wound capacitors in which two films are overlaid and wound together. The electrostatic capacity of each capacitor is 30 μF.

Evaluation is performed by comparing the measurement of tan δ at 1 kHz in the initial state with the measurement of tan δ at 1 kHz after 50 cycles. One cycle is made with no voltage applied at 0° C. for two hours and with 400VAC applied at 80° C. for two hours. For comparison of withstand voltage, step-up tests are performed at temperatures of 25° C. and 70° C. In each of the step-up tests, alternating voltage is increased from 800 V by 50 V within 10 minutes and break-down voltage is measured.

The obtained results are shown in Table 1.

TABLE 1

| | Widthwise heat shrinkage factor of at most 1.0% | Lengthwise heat shrinkage factor of at least 4% | Deposited electrode at end of margin *1 | Contact with deposited electrode *1 | Corona Treatment *2 | Tan δ at 1 kHz | | Break-down voltage in step-up test | |
|---|---|---|---|---|---|---|---|---|---|
| | | | | | | Initial state | After heat cycles | Room Temperature | 70° C. |
| Example 1 | Yes | Yes | B | B | B | 0.40% | 0.40% | 1200 V | 1100 V |
| Example 2 | No | Yes | B | B | B | 0.4%~0.6% | 0.4%~1.2% | 1100 V | 1100 V |
| Example 3 | Yes | No | B | B | B | 0.40% | 0.40% | 1000 V | 1100 V |
| Example 4-1 | Yes | Yes | x | x | B | 0.40% | 1.20% | 1200 V | 1100 V |
| Example 4-2 | Yes | Yes | A | x | B | 0.40% | 0.80% | 1200 V | 1100 V |
| Example 5-1 | Yes | Yes | B | x | B | 0.40% | 0.65% | 1200 V | 1100 V |
| Example 5-2 | Yes | Yes | B | A | B | 0.40% | 0.50% | 1200 V | 1100 V |
| Example 6-1 | Yes | Yes | B | B | x | 0.40% | 0.40% | 1050 V | 950 V |
| Example 6-2 | Yes | Yes | B | B | A | 0.40% | 0.40% | 1100 V | 1000 V |
| Conventional Example 1 | | | | | | 0.40% | 1.20% | 1200 V | 1100 V |

*1: B: at both ends, A: at one end, x: at no end
*2: B: both sides, A: one side, x: no corona treatment Comparison of Example 1, Example 2, and Conventional Example 1 shows that use of a first PP film having a widthwise heat shrinkage factor at 120° C. of at most 1.0% can reduce the widthwise stress on the both-side metallized film in a heat aging step after metal-sprayed portions are provided, and thus inhibit occurrence of contact failure of the metal-sprayed portions.

Comparison of Example 1, Example 3, and Conventional Example 1 shows that use of a second PP film having a lengthwise heat shrinkage factor at 120° C. of at least 4% can reduce air gaps existing on both sides of second PP film 20 and damage caused by corona discharge at low temperature, and thus improve withstand voltage at low temperature.

Comparison of Example 1, Example 4-1, Example 4-2, and Conventional Example 1 shows that formation of a deposited electrode at the edge on the side of the insulating margin of at least one of deposited electrodes 41 and 42 formed on both sides of first PP film 10 improves characteristics of the both-side metallized film capacitor in comparison with those of the conventional one-side metallized film capacitor. This is because formation of the deposited electrode at the edge provides mechanical connection between the sprayed metal and the deposited metal on both sides of the film and thus increases the mechanical strength of the metal-sprayed portion. Additionally, the deposited metal inhibits entry of insulting oil 70 into the PP film in the vicinity of metal-sprayed portion and thus stabilizes contact of the metal-sprayed portion even in heat cycles, e.g. heat generation in operation and cooling at rest, during use of the capacitor.

Next, Example 1, Example 5-1, Example 5-2, and Conventional Example 1 are compared with each other. Disposing the second PP film in contact with the deposited electrode at the edge on the side of the insulating margin prevents direct contact of the PP film, a base of the both-side metallized film, with insulating oil 70. Stability of contact of the metal-sprayed portions in heat cycles is drastically improved in comparison with that of the conventional one-side metallized film capacitor.

Comparison of Example 1, Example 6-1, Example 6-2, and Conventional Example 1 shows that the withstand voltage is substantially equal to that of the conventional one-side metallized film capacitor when at least one side of second PP film 20 is not subjected to corona treatment.

Second Exemplary Embodiment

The following other examples and conventional examples are produced in accordance with the second exemplary embodiment of the present invention and the experimental results thereof are detailed.

For Example 7, a metallized film capacitor structured as shown in FIG. 1 is produced by winding first PP film 10 having a thickness of 7 μm and second PP film 20 having a thickness of 6.5 μm together. For both films, maximum surface roughness Rmax is 1.5 μm and average surface roughness Ra is 0.1 μm. Rmax and Ra are measured according to JISB0601.

For Example 8, a metallized film capacitor structured as shown in FIG. 1 is produced by using second PP film 20 having a thickness of 5 μm. The other structure is the same as that of Example 7.

For Example 9, a metallized film capacitor as shown in FIG. 1 is produced by using first PP film 10 having a thickness of 7.5 μm. The other structure is the same as that of Example 7.

Figure 5:
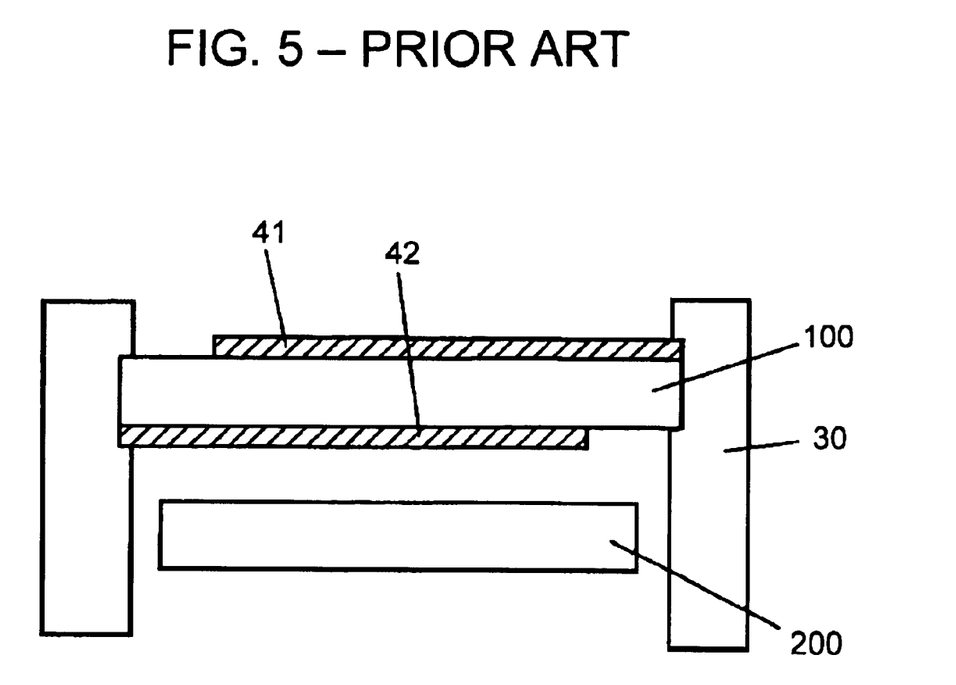
FIG. 5 is a schematic section of another conventional art, illustrating how films thereof are opposed to each other.
Figure 6:
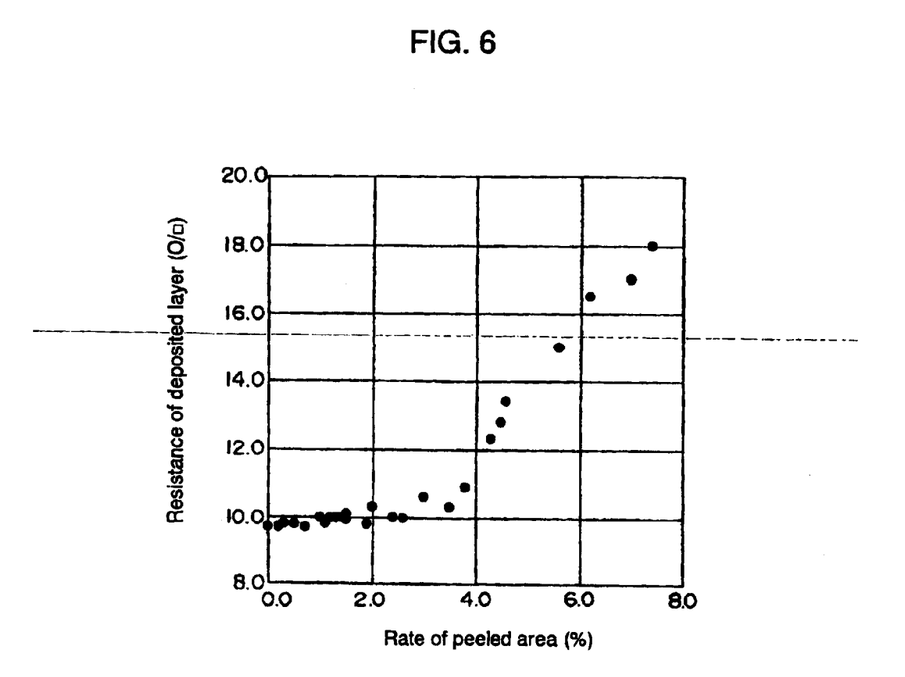
FIG. 6 is a graph showing a relation between a rate of a peeled area of a deposited metal layer and a resistance.

For Conventional Example 2, a metallized film capacitor as shown in FIG. 5 is produced by winding first PP film 100 and second PP film 200 each having a thickness of 7 μm and a maximum surface roughness Rmax of 2.5 μm in a manner similar to that of Example 7.

For Conventional Example 3, a metallized film capacitor structured as shown in FIG. 4 is produced by winding two sheets of one-side metallized PP film 7 μm thick in pairs.

Table 2 shows the withstand voltage of the capacitors, i.e. Examples 7 through 9, and Conventional Examples 2 and 3. Measured as the withstand voltage is break-down voltage in a test in which alternating voltage is incremented by 50V and each voltage is maintained for five minutes.

The results are shown in Table 2.

TABLE 2

| | Thickness of first film (both-side metallized film) (μm) | Thickness of second film (No deposited metal) (μm) | Thickness of one-side metallized film (μm) | Withstand voltage (V) |
|---|---|---|---|---|
| Example 7 | 7 | 6.5 | — | 1050 |
| Example 8 | 7 | 5 | — | 1050 |
| Example 9 | 7.5 | 6.5 | — | 1250 |
| Comparative Example | 7 | 4.5 | — | 800 |
| Conventional Example 2 | 7 | 7 | — | 1050 |
| Conventional Example 3 | — | — | 7 | 1250 |

Although the capacitor of Example 7 has a second PP film 0.5 μm thinner than that of Conventional Example 2, these two examples have the same withstand voltage of 1,050V. Because second PP film 20 has air gaps on both sides, the same withstand voltage as that of Conventional Example 2 can be obtained even with a thickness of 6.5 μm.

Although the capacitor of Example 8 has a second PP film 2 μm thinner than that of Conventional Example 2, these two examples have the same withstand voltage of 1,050V.

This result shows that second PP film 20 2 μm being thinner than first PP film 10 does not affect the withstand voltage.

As a comparative example, a capacitor including second PP film 20 having a thickness as small as 4.5 μm is produced. In this case, the withstand voltage is as small as 800V. This result shows that it is preferable to set the difference in thickness between the first and second PP films within 2 μm when surface roughness Rmax ranges 1 to 2 μm and the average roughness is at least 0.1 μm.

In the capacitor of Example 9, first PP film 10 is 0.5 μm thicker than that of Conventional Example 2. In this case, although second PP film 20 is 0.5 μm thinner than that of Conventional Example 2, the withstand voltage of Example 9 is improved to 1,250V. First PP film 10 of Example 9 has projections and depressions such that maximum surface roughness Rmax is 1.5 μm and average surface roughness Ra is 0.1 μm. This means there can be a portion 3 μm thinner than the other portions at maximum. Thus, increasing the thickness of first PP film 10 by 0.5 μm can further increase the withstand voltage.

For Example 9, increasing the thickness of first PP film 10 by 0.5 μm provides withstand voltage higher than that of Conventional Example 2 using a both-side metallized film 7 μm thick. This is the effect of thickening the first PP film.

Third Exemplary Embodiment

Further, examples and conventional examples of a laminated capacitor in accordance with the third exemplary embodiment of the present invention are produced. The experimental results thereof are detailed hereinafter.

For Example 10, a metallized film capacitor as shown in FIG. 1 is produced in the following manner. First PP film 7 μm thick and second PP film 6.5 μm thick are wound around a large-diameter core and metal-sprayed portions 30 are formed at both edge faces. Then, the wound films are cut by a metal saw to provide laminated capacitors. The sectional structure is as shown in FIG. 1. Maximum surface roughness Rmax of first PP film 10 and second PP film 20 is 2 μm and average surface roughness Ra thereof is 0.2 μm.

For Example 11, a metallized film capacitor as shown in FIG. 1 is produced so that first PP film 10 is 8 μm thick and second PP film 20 is 6 μm thick. The other production method is the same as that of Example 10.

In Conventional Example 4, each of first PP film 10 and second PP film 20 is 7 μm thick and maximum surface roughness Rmax of these PP films is 2.5 μm. The other method of producing laminated film capacitors is the same as that of Example 10.

For Conventional Example 5, laminated film capacitors are produced using two sheets of one-side metallized PP film 7 μm thick in a manner similar to that of Example 10.

Table 3 shows the withstand voltage of the capacitors, i.e. Examples 10 and 11, and Conventional Examples 4 and 5. Measured as the withstand voltage is break-down voltage in a test in which alternating voltage is incremented by 50V and each voltage is maintained for five minutes.

TABLE 3

| | Thickness of first film (both-side metallized film) (μm) | Thickness of second film (No deposited metal) (μm) | Thickness of one-side metallized film (μm) | Withstand voltage (V) |
|---|---|---|---|---|
| Example 10 | 7 | 6.5 | — | 950 |
| Example 11 | 8 | 6 | — | 1050 |
| Conventional Example 4 | 7 | 7 | — | 950 |
| Conventional Example 5 | — | — | 7 | 1000 |

The inventors have found from a large number of experiments that making the first metallized film 0.5 to 2 μm thicker than the second metallized film is effective in increasing the withstand voltage when the PP films have maximum roughness Rmax ranging from 1 to 2 μm and an average roughness of 0.1 μm.

Although the capacitor of Example 10 has a second film 0.5 μm thinner than that of Conventional Example 4, these capacitors have the same withstand voltage of 950V. In other words, this result shows that the second film can be made 0.5 μm thinner than the first film even in a laminated capacitor.

In the capacitor of Example 11, the first film is 1 mm thicker and the second film is 1 μm thinner than those of the capacitor of Conventional Example 4. This structure has improved the withstand voltage to 1,050V. Thickening a both-side metallized film having projections and depression can increase withstand voltage as shown in Example 11.

In Example 11, making the first film 1 μm thicker has made the withstand voltage thereof 50V higher than that of Conventional Example 5.

Fourth Exemplary Embodiment

Further, the following other examples and conventional examples in accordance with the fourth exemplary embodiment of the present invention are produced. The characteristics of each of the metallized film capacitors are described in comparison with those of the conventional examples.

First, a metallized film capacitor as shown in FIG. 1 is produced in the following manner. Deposited metal 41 and 42 are formed on both sides of first PP film 10 having a thickness of 6 μm so that aluminum is a lower layer and zinc is an upper layer, and the deposited layer in a capacity-forming electrodes portion has a resistance of approx. 10Ω/□ and electrode leads have a resistance of 5Ω/□. Next, by changing the time taken from vacuum deposition to slitting (time when the film is stored in the state of a roll) within the range of one hour to one week, both-side metallized PP films having different rates of the area peeled by blocking are produced.

Next, the both-side metallized PP film is slit. Then, the resistance of the deposited layer and the rate of the peeled area of the deposited layer are examined in the capacity-forming electrodes portion of each of the slit sheets. The resistance is measured with a resistance meter "Hiresta" made by the Mitsubishi Chemical Corp., according to JISK7194. The rate of the peeled area of the deposited layer is obtained by imaging the capacity-forming electrodes portion in deposited electrodes 41 and 42 via transmitted light using an optical microscope (power: 50×) having a CCD camera, capturing the obtained images into a computer to digitize into binary data indicating the portion in which deposited electrodes 41 and 42 peels and the portion in which the deposited electrodes do not peel. When the both-side metallized PP film is imaged via transmitted light, both deposited layers are observed as an overlapped image. For this reason, after one deposited electrode (e.g. 41) is removed by dropping 0.1N HCl solution, the deposited electrode on the remaining side (42) is observed. By repeating this operation on each side, the rate of peeled area can be obtained on each of the front and back sides.

The resistance of the deposited layer and the rate of the peeled area of the deposited layer that are obtained in the aforementioned manner are shown in Table 6. According to the results, when the rate of the peeled area is up to 4%, a resistance substantially equal to the resistance at vacuum deposition is obtained. In contrast, when the rate exceeds 4%, the resistance rapidly increases and the function as an electrode is affected.

Next, a metallized film capacitor structured as shown in FIG. 1 is produced using both-side metallized PP film 10 and 6-μm-thick PP film 20 in the aforementioned manner. Then, the relation between the rate of the peeled area of deposited metal 41 and 42 and the dielectric loss of the capacitor is examined. The obtained results are shown in Table. 4. Examples 12 through 14 show the cases where the rate of peeled area is up to 4%. Conventional Examples 6 and 7 show the cases where the rate exceeds 4%.

Table 4 also includes the images of the deposited electrodes in the capacity-forming electrodes portion taken by an optical microscope in the aforementioned manner, the rate of the peeled area, and the resistance of the deposited layer. Shown in Table 4 is a picture of the deposited surface on a primary side (the surface on which the deposited layer is formed first in a vacuum evaporator) of the both-side metallized PP film taken in the aforementioned manner. As for a secondary side (the surface on which the deposited layer is formed next in the vacuum evaporator), similar pictures are taken and the values in the table are obtained.

Table 4 obviously shows that a metallized film capacitor having a small loss can be obtained when the rate of the peeled area of deposited electrode 41 or 42 in the capacity-forming electrodes portion is up to 4% on each side of a both-side metallized PP film.

TABLE 4

| | Deposited layer in capacity-forming portion | Rate of peeling area (%) | | Resistance of deposited layer (Ω/□) | | Dielectric loss of capacitor (%) |
|---|---|---|---|---|---|---|
| | Primary side (power: 50×) | Primary side | Secondary side | Primary side | Secondary side | |
| Example 12 | | 0.0 | 0.1 | 9.7 | 9.8 | 0.03 |
| Example 13 | | 1.2 | 1.1 | 10.0 | 10.0 | 0.05 |
| Example 14 | | 3.2 | 3.6 | 10.6 | 11.0 | 0.06 |
| Example 6 | | 4.8 | 5.5 | 13.4 | 15.0 | 0.15 |
| Example 7 | | 7.0 | 7.3 | 17.0 | 18.0 | 0.18 |

Next, the characteristics of metallized film capacitors are examined by changing the composition of the deposited metal.

First, a zinc-deposited layer containing one of copper, silver, and aluminum as a seed metal is formed on both sides of 4-μm-thick PP film 10 to provide a roll of the aforementioned both-side metallized PP film. Next, sheets of the both-side metallized PP film each having different rates of the peeled area of deposited metal 41 and 42 are sampled from different portions. Using these samples, metallized film capacitors structured as shown in FIG. 1 are produced. The relation between the rate of the peeled area of the capacity-forming electrodes portion and the dielectric loss of the capacitor is examined. The results are shown in Table 5. Examples 15 through 19 show the examples in which the rate of the peeled area is up to 4%. Conventional Examples 8 through 10 show the examples in which the rate exceeds 4%.

TABLE 5

| | Seed metal | Rate of peeled area (%) | | Dielectric loss of capacitor (%) |
|---|---|---|---|---|
| | | Primary side | Secondary side | |
| Example 15 | Copper | 0.7 | 0.9 | 0.04 |
| Example 16 | Copper | 3.0 | 2.9 | 0.06 |
| Example 17 | Silver | 0.5 | 0.6 | 0.04 |
| Example 18 | Silver | 2.3 | 2.0 | 0.06 |

TABLE 5-continued

| | Seed metal | Rate of peeled area (%) | | Dielectric loss of capacitor (%) |
|---|---|---|---|---|
| | | Primary side | Secondary side | |
| Example 19 | Aluminum | 1.2 | 1.4 | 0.05 |
| Conventional Example 8 | Copper | 5.3 | 6.4 | 0.16 |
| Conventional Example 9 | Silver | 4.3 | 4.1 | 0.14 |
| Conventional Example 10 | Aluminum | 6.8 | 7.5 | 0.20 |

Table 5 obviously shows that a metallized film capacitor having a small loss can be obtained with any seed metal when the rate of the peeled area of the capacity-forming electrodes portion is up to 4%.

Fifth Exemplary Embodiment

Next, cases using two-layer deposited electrodes of aluminum and zinc are examined in detail. As the fifth exemplary embodiment of the present invention, metallized film capacitors each structured as shown in FIG. 1 or FIG. 2 are produced using 6-μm-thick both-side metallized PP film that has deposited electrodes 41 and 42 including an aluminum upper layer and a zinc lower layer so that the resistance of the deposited layer in the capacity-forming electrodes portion is approx. 10 Ω/□ and the resistance of electrode leads is 5Ω/□. For comparison, as a conventional example, a metallized film capacitor structured as shown in FIG. 5 is produced using a both-side metallized PP film that has a rate of the peeled area exceeding 4%. Additionally, a metallized film capacitor structured as shown in FIG. 4 is produced using two sheets of one-side metallized PP film placed one on another. Further, as shown in the Japanese Patent Unexamined Publication No. H07-24251, a metallized film capacitor structured as shown in FIG. 5 is produced using a both-side metallized PP film that has a zinc-deposited layer containing copper as a seed metal and an aluminum layer formed on the zinc layer on both sides thereof.

Charge-discharge tests are performed on these capacitors 20 times to measure the dielectric loss thereof. In the charge-discharge test, the capacitor is charged to 900VDC and forcedly short-circuited using a copper plate. Table 6 shows the results. In this case, Examples 20 through 22 show the cases where the rate of peeled area is up to 4% and Conventional Examples 11 through 13 show the cases where the rate exceeds 4%.

Comparison between Examples 20, 21 and 22 and Conventional Example 11 shows that providing deposited metal 43 and 44 at the edges of the capacity-forming electrodes portion via insulating margins as shown in FIG. 2 in a metallized film capacitor having a rate of the peeled area in the capacity-forming electrodes portion up to 4% improves contact of the deposited electrodes with metal-sprayed portions 30 and thus provide a current-resistant capacitor exhibiting less deterioration in charge-discharge tests.

For Conventional Example 12 (one-side metallized) and Conventional Example 13 (aluminum upper layer), because no deposited metal peels, the dielectric loss in the initial state is low; however, poor contact of the deposited metal with the metal-sprayed portions increases the dielectric loss after the charge-discharge tests. In contrast, for Examples 21 and 22, the dielectric loss does not increase significantly.

Also, when one of copper, silver, and aluminum is used as a seed metal of the deposited metal, providing deposited electrodes 43 and 44 at the edges of the capacity-forming electrodes portion via insulating margins can provide excellent contact.

TABLE 6

| | Deposited metal (upper layer/ lower layer) | Structure | Rate of peeled area (%) | | Dielectric loss of capacitor (%) | |
|---|---|---|---|---|---|---|
| | | | Primary side | Secondary side | Initial state | After tests |
| Example 20 | Al/Zn | FIG. 2 | 0.5 | 0.3 | 0.04 | 0.05 |
| Example 21 | Al/Zn | FIG. 2 | 3.0 | 2.9 | 0.06 | 0.07 |
| Example 22 | Al/Zn | FIG. 1 | 0.3 | 0.2 | 0.04 | 0.09 |
| Conventional Example 11 | Al/Zn | FIG. 5 | 5.0 | 4.8 | 0.14 | 0.18 |
| Conventional Example 12 | Al/Zn (one side) | FIG. 4 | 0.0 | 0.0 | 0.03 | 0.09 |
| Conventional Example 13 | Cu/Zn/Al | FIG. 5 | 0.0 | 0.0 | 0.03 | 0.24 |

INDUSTRIAL APPLICABILITY

As described above, a metallized film capacitor of the present invention uses a non-metallized polypropylene (PP) film having a lengthwise heat shrinkage factor at 120° C. of at least 4%. Thus, the capacitor element significantly shrinks in a heat aging step and air gaps decrease. Because this inhibits partial discharge, deterioration caused when a capacitor is charged for an extended period of time at low temperature or room temperature, which is a first problem, can significantly be prevented.

In the present invention, a PP film, i.e. a base of a both-side metallized PP film, has a widthwise heat shrinkage factor at 120° C. of at most 1.0%. This reduces the widthwise stress on the both-side metallized film in the step of heat-aging the element. Thus, poor contact with metal-sprayed portions, which is a second problem, can be improved.

Further in the present invention, a deposited electrode is formed at the edge of an insulating margin of a deposited electrode at least one side of the both-side metallized PP film. Thus, mechanical connection between a metal-sprayed portion and a deposited metal is provided on both sides of the film. This further increases the mechanical strength of the metal-sprayed portion and stabilizes contact with the metal-sprayed portion even in heat cycles, e.g. heat generation in operation and cooling at rest, during the use of the capacitor.

Additionally, the second PP film is disposed in contact with the deposited electrode at the edge of the insulating margin formed on the first PP film that has metal electrodes on both sides. This prevents direct contact of insulating oil with the first PP film and thus the deposited metal can inhibit entry of the insulating oil into the first PP film. Thus, deterioration of tan δ and contact, which is a third problem, can be prevented.

At least one side of the second PP film is not subjected to corona treatment. This decreases damages to the surface of the film caused by corona treatment. Thus, decrease in dielectric strength, which is a fourth problem, can be inhibited.

Further, the both-side metallized PP film is made thicker than the second PP film. This can prevent decrease in the withstand voltage of the capacitor caused by projections and depressions on the both-side metallized PP film.

In the present invention, the rate of the peeled area of the deposited layer in the capacity-forming electrodes portion is up to 4% on each side of the both-side metallized PP film. This can realize an excellent metallized film capacitor free from deterioration of tan δ and thermal runaway caused by blocking, which is a fifth problem.

Additionally, the membrane resistance of the deposited electrode in the capacity-forming electrodes portion is higher than that of the electrode lead on each side of the metallized film capacitor. This improves contact with the metal-sprayed portions.

Further, the deposited electrodes are made of zinc containing one of copper, silver, and aluminum, as a seed metal thereof. This composition can realize a preferable metallized film capacitor free from decrease in capacity even when alternating voltage is applied for an extended period of time.

What is claimed is:

1. A metallized film capacitor comprising a capacitor element, the capacitor element being made by one of winding and lamininating a first polypropylene (PP) film having metal-deposited electrodes on both sides thereof, and a second PP film opposed to the first PP film, wherein a lengthwise heat shrinkage factor at 120° C. of the second PP film is at least 4%, and wherein a widthwise heat shrinkage factor at 120° C. of the first PP film is at most 1%.

2. A metallized film capacitor comprising a capacitor element, the capacitor element being made by one of winding and laminating a first polypropylene (PP) film having metal-deposited electrodes on both sides thereof, and a second PP film opposed to the first PP film, wherein a lengthwise heat shrinkage factor at 120° C. of the second PP film is at least 4%, and wherein one of the deposited electrodes on at least one side of the first PP film has an insulating margin at one edge, and another deposited electrode is provided at an edge on a side of the insulating margin.

3. A metallized film capacitor of claim 2, wherein the second PP film is disposed in contact with the deposited electrode formed at the one edge of the insulating margin on the first PP film.

4. A metallized film capacitor comprising a capacitor element, the capacitor element being made by one of winding and laminating a first polypropylene (PP) film having metal-deposited electrodes on both sides thereof, and a second PP film opposed to the first PP film, wherein a lengthwise heat shrinkage factor at 120° C. of the second PP film is at least 4%, wherein the first PP film is thicker than the second PP film, and wherein both of the first PP film and the second PP film have maximum surface roughness Rmax ranging from 1 to 2 μm and average surface roughness Ra of at least 0.1 μm, and a difference in thickness between the first PP film and the second PP film ranges from 0.5 to 2 μm.

5. A metallized film capacitor comprising a capacitor element, the capacitor element being made by one of winding and laminating a first polypropylene (PP) film having metal-deposited electrodes on both sides thereof, and a second PP film opposed to the first PP film, wherein a lengthwise heat shrinkage factor at 120° C. of the second PP film is at least 4%, and wherein the deposited electrodes essentially consist of zinc, a rate of a peeled area of the deposited electrodes in a capacity-forming electrodes portion is up to 4%, and the capacity-forming electrodes portion has the deposited electrodes oppositely formed on both sides.

6. A metallized film capacitor of claim 5, further comprising metal-sprayed electrodes formed by metal spray at both edges of the capacitor element, wherein lead electrodes in the deposited electrodes in a vicinity of the metal-sprayed electrodes have a membrane resistance smaller than that of the capacity-forming electrodes portion.

7. A metallized film capacitor of claim 5, further comprising a seed metal deposited on the first PP film, wherein the seed metal is one of silver, copper, and aluminum.

8. A metallized film capacitor of claim 5, wherein each of the deposited electrodes has a two-layer structure including an aluminum layer deposited as a lower layer and a zinc layer deposited as an upper layer.

9. A metallized film capacitor of claim 6, wherein each of the deposited electrodes has a two-layer structure including an aluminum layer deposited as a lower layer and a zinc layer deposited as an upper layer.

10. A metallized film capacitor of claim 7, wherein each of the deposited electrodes has a two-layer structure including an aluminum layer deposited as a lower layer and a zinc layer deposited as an upper layer.

11. A metallized film capacitor comprising a capacitor element, the capacitor element being made by one of winding and laminating a first polypropylene (PP) film having deposited electrodes on both sides thereof, and a second PP film opposed to the first PP film, wherein a widthwise heat shrinkage factor at 120° C. of the first PP film is at most 1%.

12. A metallized film capacitor comprising a capacitor element, the capacitor element being made by one of winding and laminating a first polypropylene (PP) film having deposited electrodes on both sides thereof, and a second PP film opposed to the first PP film, wherein one of the deposited electrodes on at least one side of the first PP film has an insulating margin at one edge, and another deposited electrode is provided at an edge on a side of the insulating margin.

13. A metallized film capacitor of claim 12, wherein the second PP film is disposed in contact with the deposited electrode formed at the one edge of the insulating margin on the first PP film.

14. A metallized film capacitor comprising a capacitor element, the capacitor element being made by one of winding and laminating a first polypropylene (PP) film having deposited electrodes on both sides thereof, and a second PP film opposed to the first PP film, wherein the first PP film is thicker than the second PP film, and wherein both of the first PP film and the second PP film have maximum surface roughness Rmax ranging from 1 to 2 μm and average surface roughness Ra of at least 0.1 μm, and a difference in thickness between the first PP film and the second PP film ranges from 0.5 to 2 μm.

15. A metallized film capacitor comprising a capacitor element, the capacitor element being made by one of winding and laminating a first polypropylene (PP) film having deposited electrodes on both sides thereof, and a second PP film opposed to the first PP film, wherein the deposited electrodes essentially consist of zinc, a rate of a peeled area of the deposited electrodes in a capacity-forming electrodes portion is up to 4%, and the capacity-forming electrodes portion has the deposited electrodes formed oppositely on both sides.

16. A metallized film capacitor of claim 15, further comprising metal-sprayed electrodes at both edges of the capacitor element, wherein lead electrodes in the deposited electrodes in a vicinity of the metal-sprayed electrodes have a membrane resistance smaller than that of the capacity-forming electrodes portion.

17. A metallized film capacitor of claim 15, further comprising a seed metal deposited on the first PP film, wherein the seed metal is one of silver, copper, and aluminum.

18. A metallized film capacitor of claim 15, wherein one of the deposited electrodes on at least one side of the first PP film has an insulating margin at one edge, and another deposited electrode is provided at an edge on a side of the insulating margin.

19. A metallized film capacitor of claim 16, wherein one of the deposited electrodes on at least one side of the first PP film has an insulating margin at one edge, and another deposited electrode is provided at an edge on a side of the insulating margin.

20. A metallized film capacitor of claim 17, wherein one of the deposited electrodes on at least one side of the first PP film has an insulating margin at one edge, and another deposited electrode is provided at an edge on a side of the insulating margin.

* * * * *

UNITED STATES PATENT AND TRADEMARK OFFICE
CERTIFICATE OF CORRECTION

PATENT NO. : 6,954,349 B2  Page 1 of 1
APPLICATION NO. : 10/479957
DATED : October 11, 2005
INVENTOR(S) : Kohei Shiota et al.

It is certified that error appears in the above-identified patent and that said Letters Patent is hereby corrected as shown below:

IN THE CLAIMS

In column number 16, line 57, please replace "120 °C. of" with --120 °C of--.

In column number 16, line 59, please replace "120 °C. of" with --120 °C of--.

In column number 16, line 65, please replace "120 °C. of" with --120 °C of--.

In column number 17, line 14, please replace "120 °C. of" with --120 °C of--.

In column number 17, line 26, please replace "120 °C. of" with --120 °C of--.

In column number 17, line 59, please replace "120 °C. of" with --120 °C of--.

Signed and Sealed this

Sixth Day of March, 2007

JON W. DUDAS
*Director of the United States Patent and Trademark Office*